(12) United States Patent
Matsuura

(10) Patent No.: US 10,101,980 B2
(45) Date of Patent: Oct. 16, 2018

(54) COMPILATION METHOD AND INFORMATION PROCESSING APPARATUS

(71) Applicant: FUJITSU LIMITED, Kawasaki-shi, Kanagawa (JP)

(72) Inventor: Takayuki Matsuura, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/785,480

(22) Filed: Oct. 17, 2017

(65) Prior Publication Data

US 2018/0157470 A1 Jun. 7, 2018

(30) Foreign Application Priority Data

Dec. 5, 2016 (JP) .................. 2016-235497

(51) Int. Cl.
  *G06F 9/44* (2018.01)
  *G06F 8/41* (2018.01)
  *G06F 8/30* (2018.01)

(52) U.S. Cl.
  CPC .............. *G06F 8/447* (2013.01); *G06F 8/30* (2013.01); *G06F 8/443* (2013.01); *G06F 8/4434* (2013.01)

(58) Field of Classification Search
  CPC ........ G06F 8/443; G06F 8/4434; G06F 8/447; G06F 8/30
  See application file for complete search history.

(56) References Cited

U.S. PATENT DOCUMENTS

| 6,681,388 B1 | 1/2004 | Sato et al. |
| 7,496,923 B2 | 2/2009 | Inagaki et al. |
| 8,276,116 B2 | 9/2012 | Nakahara |
| 2007/0300210 A1 | 12/2007 | Haraguchi |
| 2010/0042976 A1* | 2/2010 | Hines ................. G06F 8/72 717/127 |

FOREIGN PATENT DOCUMENTS

| JP | 2000-112901 | 4/2000 |
| JP | 2000-222219 | 8/2000 |
| JP | 2007-328692 | 12/2007 |
| JP | 2008-3882 | 1/2008 |

* cited by examiner

*Primary Examiner* — Tuan A Vu
(74) *Attorney, Agent, or Firm* — Fujitsu Patent Center

(57) ABSTRACT

A memory stores a source code that describes a first matrix process that uses a variable-length matrix and a size change process that changes the size of the variable-length matrix after a start of the first matrix process. A processor generates a first code for selectively executing the first matrix process and a second matrix process that uses a fixed-length matrix corresponding to the variable-length matrix, and generates a second code for selecting the second matrix process as the initial state of the first code. The processor generates a third code for moving the data stored in the fixed-length matrix to the variable-length matrix and for switching the second matrix process to the first matrix process, at a position corresponding to the size change process. The processor generates an execution program including the first, second, and third codes.

6 Claims, 13 Drawing Sheets

FIG. 4
SOURCE CODE
```
int array_mat[3][3];
```
151
LOGICAL STRUCTURE
|   | 0 | 1 | 2 |
|---|---|---|---|
| 0 | 1 | 2 | 3 |
| 1 | 4 | 5 | 6 |
| 2 | 7 | 8 | 9 |
161
array_mat
array_mat REGION
| 1 | 2 | 3 | 4 | 5 | 6 | 7 | 8 | 9 |
171

FIG. 7

SOURCE CODE                    153

```
#include <vector>
...

vector<int> vec_x1, vec_x2, vec_x3;
vector<vector<int>> vec_mat;
int mat_size = 3;
for ( int i = 1; i <= mat_size; ++i ) {
    vec_x1.push_back( i );
    vec_x2.push_back( i + mat_size*1);
    vec_x3.push_back( i + mat_size*2);
}
vec_mat.push_back( vec_x1 );
vec_mat.push_back( vec_x2 );
vec_mat.push_back( vec_x3 );
...

for ( int i = 0; i < vec_mat.size(); ++i ) {
    for ( int j = 0; j < mat_size; ++j ) {
        answer += vec_mat[ i ][ j ];
    }
}
...
```

FIG. 8

SOURCE CODE
⎯154

```
#include <vector>
...

vector<int> vec_x1, vec_x2, vec_x3;
vector<vector<int>> vec_mat;
matrix = new new_vector( vec_mat );
/* SET matrix FLAG TO ON */
int mat_size = 3;
for ( int i = 0; i < 3; ++i ) {
    for ( int j = 0; j < 3; ++j) {
        matrix[ i ][ j ] = j + 1 + mat_size*i;
    }
}
/* ALLOCATE MEMORY REGION OF vec_mat */
...

if ( matrix_flg ) {
    for ( int i = 0; i < 3; ++i ) {
        for ( int j = 0; j < 3; ++j ) {
            answer += matrix[ i ][ j ];
        }
    }
} else {
    for ( int i = 0; i < vec_mat.size(); ++i ) {
        for ( int j = 0; j < mat_size; ++j ) {
            answer += vec_mat[ i ][ j ];
        }
    }
}
...
```

FIG. 9

SOURCE CODE  /— 155

```
#include <vector>
...
if ( ... ) {
    vec_mat.resize( 4 );
} else if ( ... ) {
    call_resize( vec_mat );
}
...
```

/— 156

```
#include <vector>
void call_resize( vector<vector<int>> &vec_mat ) {
    ...
    vec_mat.resize( 4 );
    ...
}
```

FIG. 10

SOURCE CODE                           157

```
#include <vector>
...

if ( ... ) {
    /* SET matrix_flag TO OFF */
    for ( int i = 0; i < 3; ++i ) {
        for ( int j = 0; j < 3; ++j ) {
            vec_mat[ i ][ j ] = matrix[ i ][ j ];
        }
    }
    vec_mat.resize( 4 );
} else if ( ... ) {
    /* SET matrix_flag TO OFF */
    for ( int i = 0; i < 3; ++i ) {
        for ( int j = 0; j < 3; ++j ) {
            vec_mat[ i ][ j ] = matrix[ i ][ j ];
        }
    }
    call_resize( vec_mat );
}
...
```

COMPILATION METHOD AND INFORMATION PROCESSING APPARATUS

CROSS-REFERENCE TO RELATED APPLICATION

This application is based upon and claims the benefit of priority of the prior Japanese Patent Application No. 2016-235497, filed on Dec. 5, 2016, the entire contents of which are incorporated herein by reference.

FIELD

The embodiments discussed herein relate to a compilation method and an information processing apparatus.

BACKGROUND

In software development, a source code is created in human-understandable high-level language and is converted to a machine readable execution program by using a compiler in most cases. In the source code, a matrix is sometimes used as a data structure for systematically managing a plurality of data elements. The matrix is a frequently used data structure and therefore is included in a standard library provided in a program execution environment.

The type of the matrix includes a fixed-length matrix and a variable-length matrix. A source code includes variable declaration that fixes the matrix size of the fixed-length matrix, and the fixed-length matrix does not change its size dynamically during operation. On the other hand, the variable declaration is needless to fix the matrix size of the variable-length matrix, and the variable-length matrix is able to change its size dynamically. How to manage a memory region during execution differs between the fixed-length matrix and the variable-length matrix, and thus both of the fixed-length matrix and the variable-length matrix are sometimes included in a program execution environment, a standard library, or the like.

There is proposed a compiler that converts a source code to an execution program for a distributed memory parallel computer. The proposed compiler divides a one-dimensional matrix in the source code into a plurality of partial matrices, each of which is a continuous section, in order to convert the one-dimensional matrix to a multidimensional matrix. The compiler performs automatic parallelization to the converted multidimensional matrix.

Also, there is proposed a matrix processing method that uses a multidimensional matrix structured as nesting of matrices (a data structure in which each element of the matrix of a higher level is a matrix of a lower level). At the time of compilation, the proposed matrix processing method generates an optimized code that is optimized under a premise that the matrices of the lowest level are stored in contiguous memory regions, as well as a non-optimized code that is not optimized in such a manner. At the time of execution, the non-optimized code is executed to access the matrices whose elements have been changed since initialization, and the optimized code is executed to access other matrices.

Also, there is proposed an algebra computing device that is capable of describing algebra operation between a plurality of vector variables briefly by utilizing an overload function of operator in an object-oriented programming language. The proposed algebra computing device reduces intermediate vector data generated during the algebra operation between the vector variables, and thereby reduces its overhead.

Also, there is proposed a compilation apparatus that handles a list vector that links a plurality of structure regions by a link list, as one data structure. The proposed compilation apparatus generates an execution program in which a predetermined number of structure regions are collectively stored in contiguous regions in a memory when a region allocation request is issued in a loop for the first time.

See, for example, Japanese Laid-open Patent Publication Nos. 2000-112901, 2000-222219, 2007-328692, and 2008-3882.

The variable-length matrix is able to dynamically change its matrix size after variable declaration and thus has an advantage of being used more easily than the fixed-length matrix in creating a source code. On the other hand, an execution program that includes the variable-length matrix has the next problem in execution efficiency.

The fixed-length matrix has a fixed matrix size, and thus its data elements are able to be arranged densely and contiguously in a memory, so that the compiled execution program often uses the contiguous memory regions. In contrast, the variable-length matrix has a variable matrix size, and thus all data elements are unable to be arranged densely in a memory, depending on how to use the variable-length matrix. Thus, the compiled execution program uses discontiguous memory regions in some cases. For example, a memory region corresponding to a certain row and a memory region corresponding to the next row are sometimes discontiguous in a variable-length two-dimensional matrix whose number of columns is variable. It is concerned that, when the memory regions are discontiguous, the execution efficiency becomes lower, due to decrease in cache efficiency, than when the memory region are contiguous.

SUMMARY

According to one aspect, there is provided a non-transitory computer-readable storage medium storing a computer program that causes a computer to perform a procedure including: acquiring a source code that describes a first matrix process that uses a variable-length matrix and a size change process that changes a size of the variable-length matrix after a start of the first matrix process; generating a first code for selectively executing the first matrix process and a second matrix process that uses a fixed-length matrix corresponding to the variable-length matrix, and generating a second code for selecting the second matrix process from among the first and second matrix processes, as an initial state of the first code, based on description of the first matrix process; generating a third code for moving data stored in the fixed-length matrix to the variable-length matrix and for switching the second matrix process to the first matrix process in the first code, at a position corresponding to the size change process; and generating an execution program including the first, second, and third codes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a logical structure and memory arrangement of a fixed-length two-dimensional matrix;

FIG. 7 illustrates a first original source code example;

FIG. 8 illustrates a first optimization example in the form of source code;

FIG. 9 illustrates a second original source code example;

FIG. 10 illustrates a second optimization example in the form of source code;

DESCRIPTION OF EMBODIMENTS

Figure 1:
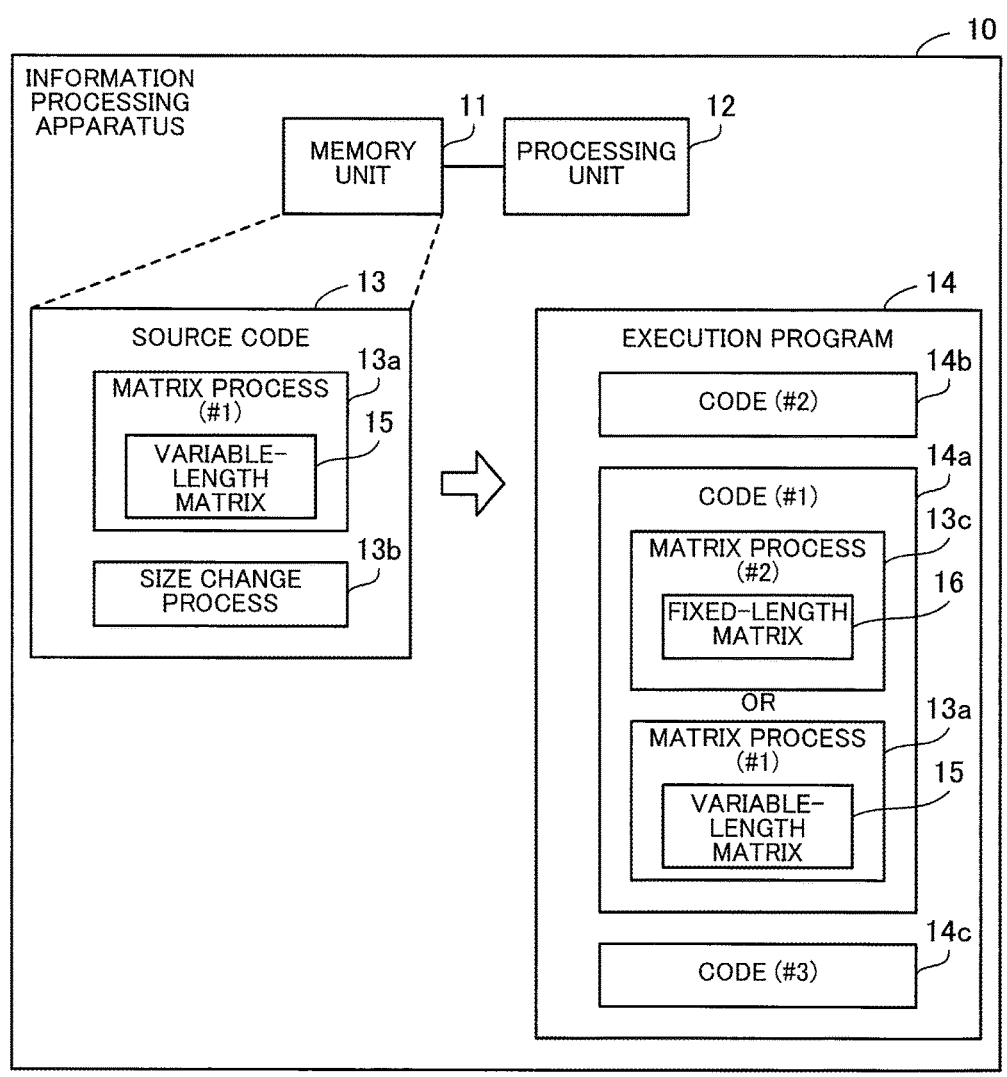
FIG. 1 illustrates an example of an information processing apparatus of a first embodiment.

Several embodiments will be described below with reference to the accompanying drawings, wherein like reference numerals refer to like elements throughout.

First Embodiment

A first embodiment will be described. FIG. 1 illustrates an example of an information processing apparatus of the first embodiment.

The information processing apparatus 10 of the first embodiment compiles a source code described in a high-level language, such as C++, and generates an execution program to be executed by a processor. The execution program is described with a machine readable object code, for example. The information processing apparatus 10 is also referred to as a compilation apparatus. The information processing apparatus 10 may be a computer that executes a software compiler. Also, the information processing apparatus 10 may be a client apparatus operated by a user, and may be a server apparatus accessed from a client apparatus.

The information processing apparatus 10 includes a memory unit 11 and a processing unit 12. The memory unit 11 is a volatile memory device, such as a random access memory (RAM), or a non-volatile memory device, such as a hard disk drive (HDD) and a flash memory, for example. The processing unit 12 is a processor, such as a central processing unit (CPU) and a digital signal processor (DSP), for example. Note that the processing unit 12 may include an application specific electronic circuit, such as an application specific integrated circuit (ASIC) and a field programmable gate array (FPGA). The processor executes a program stored in a memory, such as a RAM. For example, the processor executes a compilation program for compiling a source code. A group of processors is sometimes referred to as "multiprocessor" or "processor".

The memory unit 11 stores a source code 13. A matrix process 13a (a first matrix process) and a size change process 13b are described in the source code 13. A variable-length matrix 15 is used in the matrix process 13a. The variable-length matrix 15 is a data set for storing a plurality of data elements and is able to change the number (matrix length) of stored data elements after variable declaration. The variable-length matrix 15 is of a data type, such as vector, defined by a standard library, for example. The size change process 13b changes the size (matrix length) of the variable-length matrix 15 after a start of the matrix process 13a. The size of the variable-length matrix 15 is changed by designating a size or by adding a data element to the variable-length matrix 15, for example.

The processing unit 12 converts the source code 13 to an execution program 14. In this case, the processing unit 12 generates a code 14a (a first code) on the basis of the description of the matrix process 13a in the source code 13. The code 14a selectively executes a matrix process 13c (a second matrix process) that uses a fixed-length matrix 16 corresponding to the variable-length matrix 15, and the matrix process 13a that uses the variable-length matrix 15. The fixed-length matrix 16 is a data set for storing a plurality of data elements and is unable to change the number of stored data elements after variable declaration. The fixed-length matrix 16 is of a data type, such as array, defined by a language specification, for example. For example, the code 14a executes the matrix process 13c when a flag is ON (for example, the value of the flag is "1") and executes the matrix process 13a when the flag is OFF (for example, the value of the flag is "0").

Also, the processing unit 12 generates a code 14b (a second code) for selecting the matrix process 13c from among the matrix processes 13a and 13c in an initial state of the code 14a. The code 14b sets the above flag to ON before a start of the code 14a, for example. Thereby, of the matrix processes 13a and 13c, the matrix process 13c is executed immediately after the start of the code 14a. That is, the fixed-length matrix 16 is preferentially used as a data structure for storing a plurality of data elements.

Also, the processing unit 12 generates a code 14c (a third code) at a position corresponding to the size change process 13b. The code 14c moves the data elements stored in the fixed-length matrix 16 to the variable-length matrix 15, and switches the matrix process 13c to the matrix process 13a in the code 14a. The code 14c updates the above flag to OFF, for example. The size change process 13b is performed to the variable-length matrix 15 after the data elements are moved from the fixed-length matrix 16 to the variable-length matrix 15, for example. If the code 14c is executed at least once, the matrix process 13a, among the matrix processes 13a and 13c, is executed in the code 14a. That is, thereafter, the variable-length matrix 15 is used as the data structure for storing the data elements.

Thereby, the processing unit 12 generates the execution program 14 that includes the codes 14a, 14b, and 14c. For example, the codes 14a, 14b, and 14c are the object codes corresponding to the above processes, and are a set of commands to be executed by the processor.

The information processing apparatus 10 of the first embodiment generates the code 14a to selectively execute the matrix process 13a using the variable-length matrix 15 and the matrix process 13c using the fixed-length matrix 16, on the basis of the description of the matrix process 13a, at the time of compilation. Also, the information processing apparatus 10 generates the code 14b for selecting the matrix process 13c as an initial state. Also, the information processing apparatus 10 generates the code 14c for moving data from the fixed-length matrix 16 to the variable-length matrix 15 at the time of the size change process 13b and thereafter selecting the matrix process 13a.

Thereby, even when the variable-length matrix 15 is designated to be used in the source code 13, the fixed-length matrix 16 is used instead of the variable-length matrix 15 until the size change process 13b is executed. A plurality of data elements are densely arranged in the memory as long as the fixed-length matrix 16 is used, and thus it is highly possible that contiguous memory regions are allocated for the fixed-length matrix 16. Thereby, the execution efficiency of the execution program 14 improves. For example, as the contiguous memory regions are allocated for the fixed-length matrix 16, a cache memory stores a larger number of data elements at once, thereby improving the memory access efficiency.

The variable-length matrix 15 is automatically converted to the fixed-length matrix 16 at the time of compilation. Thus, the source code 13 is created by using the variable-length matrix 15, which is needless to fix its matrix size in variable declaration, and thereby the creation of the source code 13 is made easier. When the size change process 13b is executed, the fixed-length matrix 16 is set back to the variable-length matrix 15, and thereafter the variable-length matrix 15 is used. Thus, information processing intended by the source code 13 is achieved. For example, this prevents data destruction due to insertion of a new data element into a plurality of data elements located densely in a memory. As described above, the execution efficiency of the execution program 14 improves safely by using the fixed-length matrix 16 instead of the variable-length matrix 15 in an allowable situation.

Second Embodiment

Next, a second embodiment will be described. A compilation apparatus 100 of the second embodiment compiles a source code described in a high-level language and generates a machine readable object code. The compilation apparatus 100 may be a client apparatus (also referred to as a terminal apparatus) operated by a user, and may be a server apparatus accessed from a client apparatus. The compilation apparatus 100 is a computer that executes a software compiler and a software linker.

Figure 2:
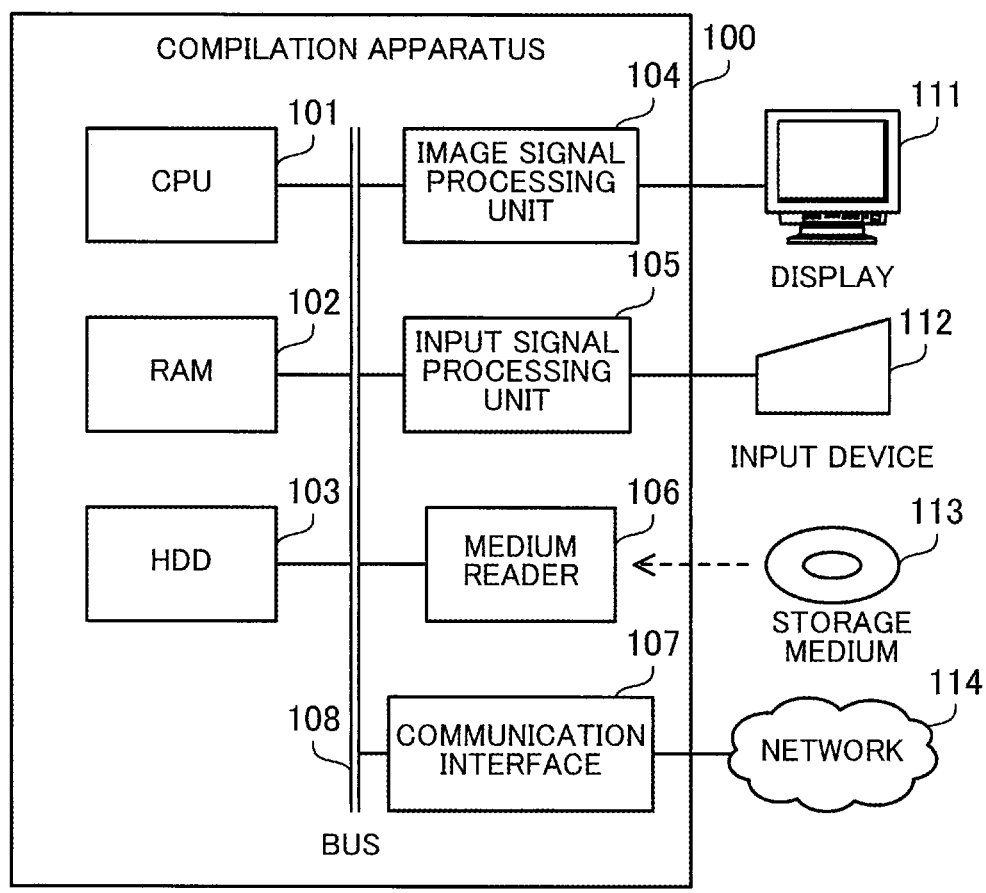
FIG. 2 is a block diagram illustrating a hardware example of a compilation apparatus.

FIG. 2 is a block diagram illustrating a hardware example of the compilation apparatus. The compilation apparatus 100 includes a CPU 101, a RAM 102, an HDD 103, an image signal processing unit 104, an input signal processing unit 105, a medium reader 106, and a communication interface 107. The above units are connected to a bus 108.

The CPU 101 is a processor including a computing circuit that executes commands of programs. The CPU 101 loads at least part of programs and data stored in the HDD 103 into the RAM 102, and executes the programs. Note that the CPU 101 may include a plurality of processor cores, and the compilation apparatus 100 may include a plurality of processors, so that the process described below is executed in parallel by using the processors or processor cores. A group of processors is sometimes referred to as "multiprocessor" or "processor".

The RAM 102 is a volatile semiconductor memory that temporarily stores programs executed by the CPU 101 and data that the CPU 101 uses in computation. Note that the compilation apparatus 100 may include a memory of a type other than the RAM, and may include a plurality of memories.

The HDD 103 is a non-volatile storage device for storing programs and data of an operating system (OS), middleware, and software such as application software. The programs include a compilation program and a link program. Note that the compilation apparatus 100 may include a memory device of another type, such as a flash memory and a solid state drive (SSD), and may include a plurality of non-volatile memory devices.

The image signal processing unit 104 outputs the image to a display 111 connected to the compilation apparatus 100, in accordance with a command from the CPU 101. The display 111 is, for example, a cathode ray tube (CRT) display, a liquid crystal display (LCD), a plasma display, or an organic electro-luminescence (OEL) display.

The input signal processing unit 105 acquires an input signal from an input device 112 connected to the compilation apparatus 100, and outputs the input signal to the CPU 101. The input device 112 is, for example, a pointing device, such as a mouse, a touch panel, a touch pad, and a trackball, as well as a keyboard, a remote controller, and a button switch. Also, a plurality of types of input devices may be connected to the compilation apparatus 100.

The medium reader 106 is a reader device for reading programs and data stored in a storage medium 113. The storage medium 113 is, for example, a magnetic disk, an optical disc, a magneto-optical disk (MO), or a semiconductor memory. The magnetic disk includes a flexible disk (FD) and an HDD. The optical disc includes a compact disc (CD) and a digital versatile disc (DVD).

For example, the medium reader 106 copies the programs and data read from the storage medium 113 to another storage medium, such as the RAM 102 and the HDD 103. The read programs are executed by the CPU 101, for example. Note that the storage medium 113 may be a portable storage medium, which is used to distribute the programs and data. The storage medium 113 and the HDD 103 are sometimes referred to as computer-readable storage medium.

The communication interface 107 is an interface that is connected to a network 114 to communicate with another computer via the network 114. The communication interface 107 may be a wired communication interface connected to a communication device, such as a switch, via a cable, and may be a wireless communication interface connected to a base station via a wireless link.

Note that the compilation apparatus 100 corresponds to the information processing apparatus 10 of the first embodiment. The RAM 102 or the HDD 103 corresponds to the memory unit 11 of the first embodiment. The CPU 101 corresponds to the processing unit 12 of the first embodiment.

Figure 3:
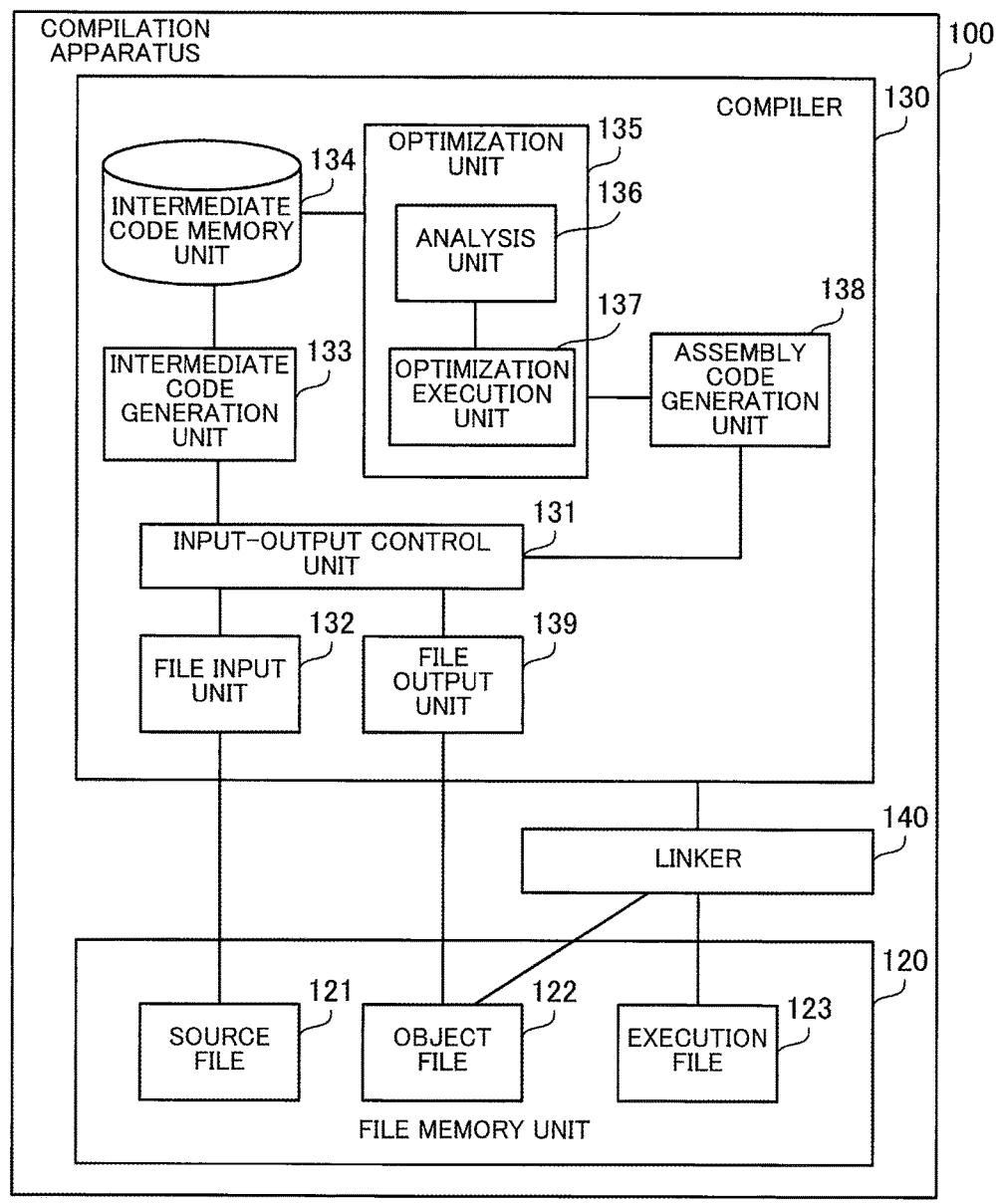
FIG. 3 is a block diagram illustrating a function example of a compilation apparatus.

FIG. 3 is a block diagram illustrating a function example of the compilation apparatus. The compilation apparatus 100 includes a file memory unit 120, a compiler 130, and a linker 140. The file memory unit 120 is implemented by using memory regions allocated in the RAM 102 or the HDD 103, for example. The compiler 130 and the linker 140 are implemented by using program modules (a compilation program and a link program) executed by the CPU 101, for example. Note that a part or all of functions of the compiler 130 and the linker 140 may be implemented as an electronic circuit, instead of software.

The file memory unit 120 stores a source file 121, an object file 122, and an execution file 123. The source file 121 includes a source code described in a high-level language, such as C++. The object file 122 includes a machine readable object code. The execution file 123 is formatted to be executed by a target processor, and includes a generated object code, a link to a library, etc. Note that the execution file 123 may be executed by the CPU 101, and may be executed by another CPU of the compilation apparatus 100 or a CPU of a computer other than the compilation apparatus 100.

The compiler 130 reads out the source file 121 from the file memory unit 120, and converts the source code to the object code, and stores the object file 122 in the file memory unit 120. The compiler 130 includes an input-output control unit 131, a file input unit 132, an intermediate code generation unit 133, an intermediate code memory unit 134, an optimization unit 135, an assembly code generation unit 138, and a file output unit 139.

The input-output control unit 131 selects an input-output method according to the type of a file and controls the file input unit 132 and the file output unit 139. The file input unit 132 opens the source file 121 in accordance with an instruction from the input-output control unit 131, and reads out the source code from the source file 121. The intermediate code generation unit 133 analyzes the source code read out by the file input unit 132, and converts the source code to an intermediate code described in an intermediate language utilized in the compiler 130, and stores the intermediate code in the intermediate code memory unit 134. The analysis of the source code includes lexical analysis, syntax analysis, semantic analysis, and the like. The intermediate code memory unit 134 is a memory region allocated in the RAM 102 to store the intermediate code.

The optimization unit 135 optimizes the intermediate code stored in the intermediate code memory unit 134, in order to improve the execution speed. The optimization unit 135 includes an analysis unit 136 and an optimization execution unit 137. The analysis unit 136 decides an optimization method by analyzing the intermediate code. In this case, the analysis unit 136 refers to a caller-callee graph that represents a caller-callee relationship between program modules. The caller-callee graph is generated by link time optimization (LTO) described later. The optimization execution unit 137 optimizes the intermediate code in accordance with the optimization method decided by the analysis unit 136. The optimization performed by the optimization unit 135 includes optimization of the matrix process that utilizes the variable-length matrix.

The assembly code generation unit 138 converts the intermediate code optimized by the optimization unit 135 to an assembly code described in a low-level assembly language. In accordance with an instruction from the input-output control unit 131, the file output unit 139 generates the object file 122, and converts the assembly code generated by the assembly code generation unit 138 to an object code, and writes the object code into the object file 122.

The linker 140 reads out the object file 122 from the file memory unit 120, and analyzes the object code, and detects other object files and libraries which are referred to. Then, the linker 140 links the object file 122 to the other object files and libraries and generates the execution file 123. Note that the function of the linker 140 may be integrated in the compiler 130.

Here, the linker 140 detects a caller-callee relationship established between program modules, each of which constitutes a unit of compilation (a unit of translation). Thus, in the link time optimization, the linker 140 generates a caller-callee graph that represents a caller-callee relationship between a plurality of program modules, and feeds the caller-callee graph back to the compiler 130.

The link time optimization twice repeats the compilation that converts the source code to the object code and the link of the object code (two pass process). In the first pass, the compiler 130 performs optimization without considering the caller-callee relationship established between compilation units, and generates the object codes of the respective compilation units. The linker 140 links those object codes to each other and generates a caller-callee graph. In the second pass, the compiler 130 performs optimization in consideration of the caller-callee relationship established between the compilation units, and generates object codes again. The linker 140 links the regenerated object codes to each other and generates the execution file 123. In the second pass, the compiler 130 optimizes a called module with reference to the processing detail of the called module.

Next, a two-dimensional matrix as a data structure will be described. A two-dimensional matrix is sometimes described in the source code. In particular, a large scale two-dimensional matrix is sometimes described in the source code for use in science and technology calculation. A two-dimensional matrix has a data structure that systematically stores a plurality of data elements of the same type (for example, integer, floating point real number, etc.) and specifies each data element by a row number and a column number. There is a fixed-length two-dimensional matrix in which the number of rows and the number of columns are fixed at the time of variable declaration, as well as a variable-length two-dimensional matrix that may change the number of rows and the number of columns after variable declaration. A typical example of the fixed-length two-dimensional matrix is an array two-dimensional matrix which is defined by the specification of a programming language. A typical example of the variable-length two-dimensional matrix is a vector two-dimensional matrix which is created by using a vector library. How to describe a source code and how to use a memory region to execute an object code are different, depending on the fixed-length two-dimensional matrix and the variable-length two-dimensional matrix.

FIG. 4 illustrates an example of a logical structure and memory arrangement of a fixed-length two-dimensional matrix. The source code 151 declares a fixed-length two-dimensional matrix array_mat of three rows by three columns. The data type of elements of array_mat is integer. The fixed-length two-dimensional matrix described in the source code 151 corresponds to a logical structure 161. The logical structure 161 is a matrix of three rows by three columns defined by the row number 0 to 2 and the column number 0 to 2. An integer #1 is stored in (0, 0). An integer #2 is stored in (0, 1). An integer #3 is stored in (0, 2). An integer #4 is stored in (1, 0). An integer #5 is stored in (1, 1). An integer #6 is stored in (1, 2). An integer #7 is stored in (2, 0). An integer #8 is stored in (2, 1). An integer #9 is stored in (2, 2).

When the object code generated by compiling the source code 151 is executed, an array_mat region 171 is allocated in the memory in most cases. The array_mat region 171 includes contiguous regions having a length corresponding to the number of elements of the fixed-length two-dimensional matrix. The integers #1 to #9 are densely and contiguously stored in the array_mat region 171. That is, the integer #2 is stored immediately after the integer #1. The integer #3 is stored immediately after the integer #2. The integer #4 is stored immediately after the integer #3. The integer #5 is stored immediately after the integer #4. The integer #6 is stored immediately after the integer #5. The integer #7 is stored immediately after the integer #6. The integer #8 is stored immediately after the integer #7. The integer #9 is stored immediately after the integer #8.

As described above, the integer #4 at the head of the row of the row number 1 is stored without an interval after the integer #3 at the end of the row of the row number 0. Also, the integer #7 at the head of the row of the row number 2 is stored without an interval after the integer #6 at the end of the row of the row number 1. The number of rows and the number of columns are fixed in the fixed-length two-dimensional matrix, and thus the elements are arranged densely.

Figure 5:
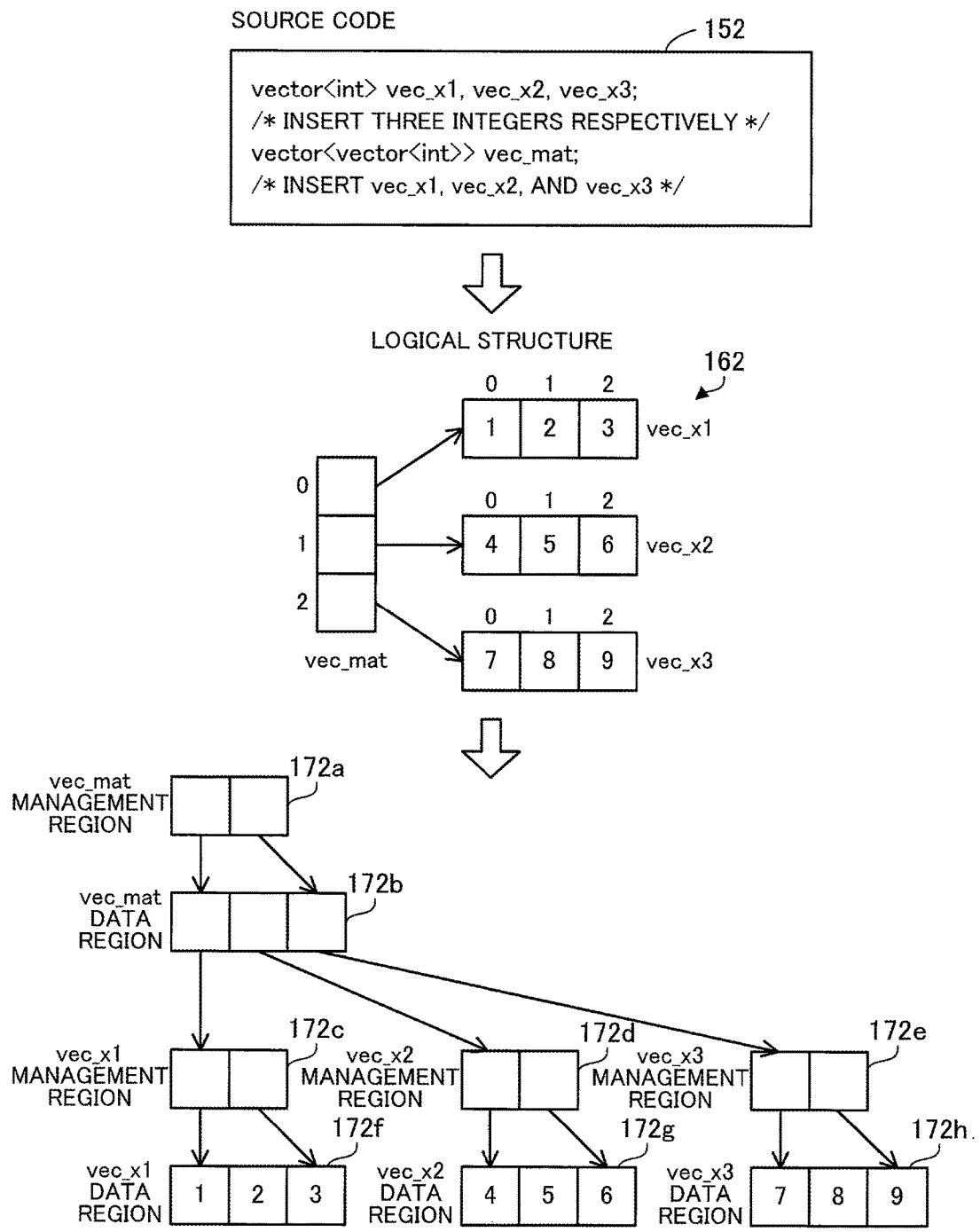
FIG. 5 illustrates an example of a logical structure and memory arrangement of a variable-length two-dimensional matrix.

FIG. 5 illustrates an example of a logical structure and memory arrangement of a variable-length two-dimensional matrix. The source code 152 declares a variable-length two-dimensional matrix vec_mat. The vector two-dimensional matrix vec_mat is created by using a vector library in a standard library provided by the specification of a programming language. Although a vector matrix defined by a vector library is a one-dimensional matrix, a two-dimensional matrix is created by assigning vector matrices to the elements of the vector matrix.

Here, the source code 152 declares vector matrices vec_x1, vec_x2, and vec_x3. The data type of the elements of vec_x1, vec_x2, and vec_x3 is integer. The integers #1 to #3 are inserted in vec_x1. The integers #4 to #6 are inserted in vec_x2. The integers #7 to #9 are inserted in vec_x3. The data type of the elements of vec_mat is vector. The vector matrices vec_x1, vec_x2, and vec_x3 are inserted in vec_mat. Thereby, a two-dimensional matrix of three rows by three columns is created. Also, the number of rows and the number of columns are changeable after variable declaration. For example, the number of rows is increased by inserting another vector matrix in vec_mat, and the number of columns is increased by additionally inserting integers in vec_x1, vec_x2, and vec_x3.

The variable-length two-dimensional matrix described in the source code 152 corresponds to a logical structure 162. The logical structure 162 includes a one-dimensional matrix vec_x1, a one-dimensional matrix vec_x2, a one-dimensional matrix vec_x3, and a one-dimensional matrix vec_mat. The one-dimensional matrix vec_mat is equivalent to an index that indicates the heads of vec_x1, vec_x2, and vec_x3. The zeroth element of vec_mat indicates vec_x1, and the first element of vec_mat indicates vec_x2, and the second element of vec_mat indicates vec_x3. The logical structure 162 is used as a substantially same two-dimensional matrix as the logical structure 161. The element number 0 to 2 of vec_mat corresponds to the row number of the two-dimensional matrix, and the element numbers 0 to 2 of vec_x1, vec_x2, and vec_x3 correspond to the column number of the two-dimensional matrix.

When the object code generated by compiling the source code 152 is executed, below eight regions are allocated in the memory, for example. A vec_mat management region 172a and a vec_mat data region 172b are allocated for vec_mat. A vec_x1 management region 172c and a vec_x1 data region 172f are allocated for vec_x1. A vec_x2 management region 172d and a vec_x2 data region 172g are allocated for vec_x2. A vec_x3 management region 172e and a vec_x3 data region 172h are allocated for vec_x3. Although each of these eight regions is a continuous memory region, continuity is not guaranteed between different regions. For example, continuity is not guaranteed between the vec_x1 data region 172f and the vec_x2 data region 172g.

The vec_mat management region 172a stores information for easily accessing the vec_mat data region 172b. The vec_mat management region 172a at least stores a pointer that indicates the head element of the vec_mat data region 172b and a pointer that indicates the last element of the vec_mat data region 172b.

The vec_mat data region 172b stores the real data of the elements of vec_mat. Note that the elements of vec_mat are vector matrices, and thus the vec_mat data region 172b stores pointers to these vector matrices. Specifically, the vec_mat data region 172b stores a pointer that indicates the head element of the vec_x1 management region 172c, a pointer that indicates the head element of the vec_x2 management region 172d, and a pointer that indicates the head element of the vec_x3 management region 172e.

The vec_x1 management region 172c stores information for easily accessing the vec_x1 data region 172f. The vec_x1 management region 172c at least stores a pointer that indicates the head element of the vec_x1 data region 172f and a pointer that indicates the last element of the vec_x1 data region 172f.

Likewise, the vec_x2 management region 172d stores information for easily accessing the vec_x2 data region 172g. The vec_x2 management region 172d at least stores a pointer that indicates the head element of the vec_x2 data region 172g and a pointer that indicates the last element of the vec_x2 data region 172g. Also, the vec_x3 management region 172e stores information for easily accessing the vec_x3 data region 172h. The vec_x3 management region 172e at least stores a pointer that indicates the head element of the vec_x3 data region 172h and a pointer that indicates the last element of the vec_x3 data region 172h.

The vec_x1 data region 172f stores the real data of the elements of vec_x1. The vec_x1 data region 172f includes contiguous regions having a length corresponding to the number of elements of vec_x1, and a plurality of elements are densely arranged without an interval. Here, the vec_x1 data region 172f stores the integers #1 to #3. The integer #2 is stored immediately after the integer #1, and the integer #3 is stored immediately after the integer #2.

Likewise, the vec_x2 data region 172g stores the real data of the elements of vec_x2. The vec_x2 data region 172g includes contiguous regions having a length corresponding to the number of elements of vec_x2, and a plurality of elements are densely located without an interval. Here, the vec_x2 data region 172g stores the integers #4 to #6. The integer #5 is stored immediately after the integer #4, and the integer #6 is stored immediately after the integer #5. Also, the vec_x3 data region 172h stores the real data of the elements of vec_x3. The vec_x3 data region 172h are contiguous regions having a length corresponding to the number of elements of vec_x3, and a plurality of elements are densely located without an interval. Here, the vec_x3 data region 172h stores the integers #7 to #9. The integer #8 is stored immediately after the integer #7, and the integer #9 is stored immediately after the integer #8.

As described above, a plurality of pointers are traced until the integers #1 to #9 are reached from the vec_mat management region 172a. Also, the integer #3 at the end of the row of the row number 0 and the integer #4 at the head of the row of the row number 1 are stored discontiguously, and the integer #6 at the end of the row of the row number 1 and the integer #7 at the head of the row of the row number 2 are stored discontiguously. The number of rows and the number of columns are variable in the variable-length two-dimensional matrix, and thus the elements are unable to be arranged densely in case the number of rows and the number of columns increase. As a result, the number of memory accesses increases, and it becomes difficult to store the elements of a certain row and the elements of the next row into a cache memory at a time, and the cache efficiency decreases. Thus, it is concerned that the variable-length two-dimensional matrix causes lower execution efficiency than the fixed-length two-dimensional matrix.

Here, if the fixed-length two-dimensional matrix is used, the number of rows and the number of columns are fixed at the time of variable declaration, whereas if the variable-length matrix is used, the number of rows and the number of columns are needless to be fixed at the time of variable declaration, and thereby it becomes easy to create a source code. Thus, a variable-length two-dimensional matrix, such as a vector two-dimensional matrix, is described in the source code compiled by the compilation apparatus 100, in some cases. However, when such a source code is simply compiled, the created object code has a lower execution efficiency than the object code created using the fixed-length two-dimensional matrix, as described above.

Thus, in the optimization during compilation, the compilation apparatus 100 automatically replaces a variable-length two-dimensional matrix that satisfies a predetermined condition by a fixed-length two-dimensional matrix, thereby improving the execution efficiency of the generated object code. However, when there is a command that later changes the size of the variable-length two-dimensional matrix, it is possible that the data is destroyed if the command is executed.

For example, in order to increase the number of columns by adding an integer to the end of vec_x1 in the memory arrangement illustrated in FIG. 5, a new integer is stored after the integer #3 of the vec_x1 data region 172f, and a pointer of the vec_x1 management region 172c is updated. The vec_x1 data region 172f and the vec_x2 data region 172g are discontiguous, and thus the integer #4 of the vec_x2 data region 172g is not destroyed by the insertion of the new integer. In contrast, the integer #4 is stored immediately after the integer #3 of the array_mat region 171 in the memory arrangement illustrated in FIG. 4. Thus, if the number of columns were increased by assigning an integer to array_mat[0][3], the integer #4 immediately after the integer #3 would be overwritten and erased.

Thus, the compilation apparatus 100 creates an object code that uses a fixed-length two-dimensional matrix at the beginning instead of a variable-length two-dimensional matrix and sets the fixed-length two-dimensional matrix back to the variable-length two-dimensional matrix immediately before a command that changes the matrix size is executed. Thereby, the variable-length two-dimensional matrix performs its feature, i.e., changes its size later, and the execution efficiency of the object code is improved by using the fixed-length two-dimensional matrix as long as the size is not changed.

Figure 6:
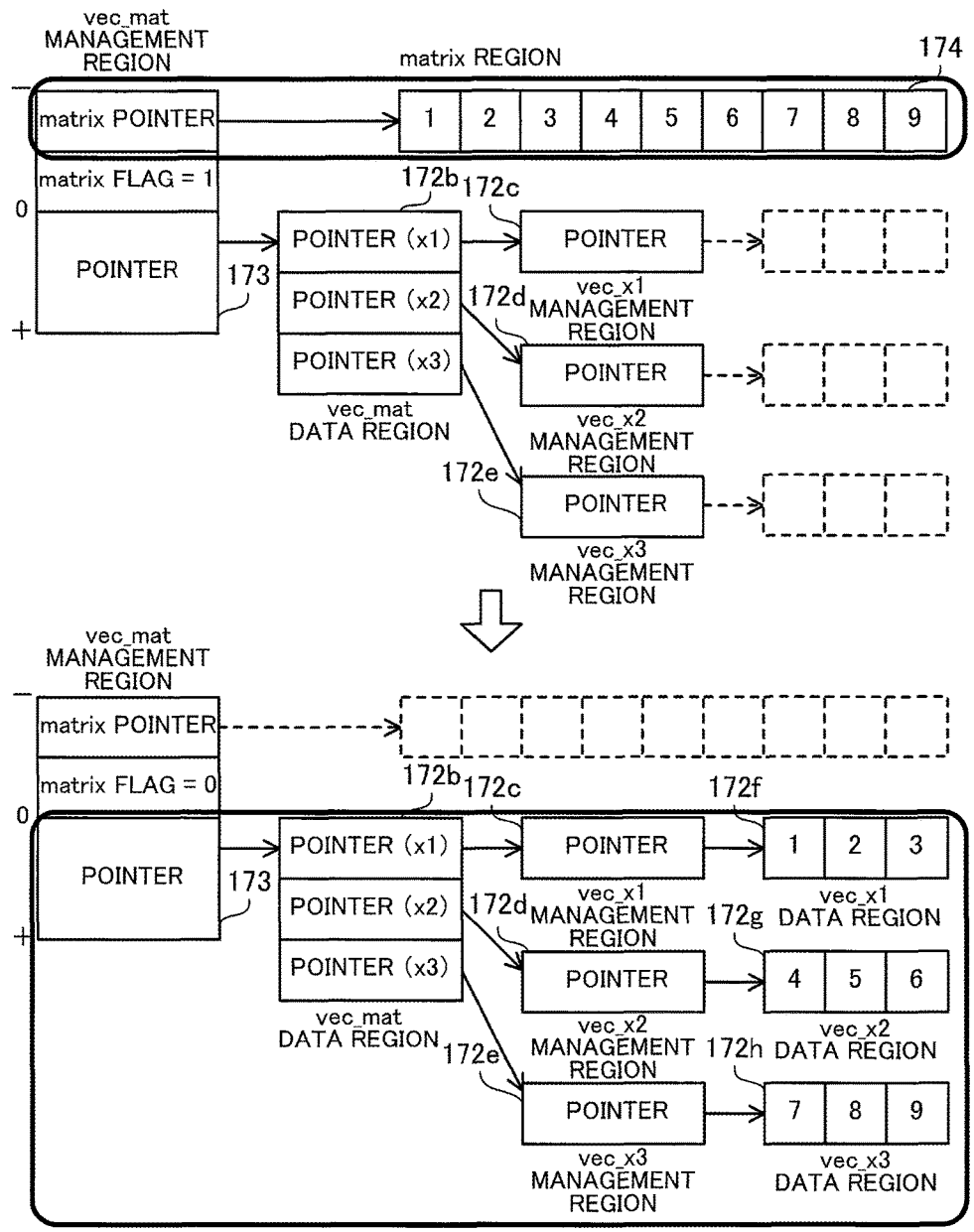
FIG. 6 illustrates a switch example of a fixed-length two-dimensional matrix and a variable-length two-dimensional matrix.

FIG. 6 illustrates a switch example from a fixed-length two-dimensional matrix to a variable-length two-dimensional matrix. The compilation apparatus 100 generates an object code that performs the next operation.

Below six regions are allocated in the memory at the beginning for the vector two-dimensional matrix described in the source code 152. In the same way as FIG. 5, the vec_mat data region 172b, the vec_x1 management region 172c, the vec_x2 management region 172d, and the vec_x3 management region 172e are allocated. Also, the vec_mat management region 173 and matrix region 174 are allocated. The vec_x1 data region 172f, the vec_x2 data region 172g, and the vec_x3 data region 172h are needless to be allocated at the beginning.

The vec_mat management region 173 stores the same pointers as the vec_mat management region 172a of FIG. 5, in the direction (positive direction) in which the memory address increases from a reference position of vec_mat. That is, the vec_mat management region 173 stores a pointer that indicates the head element of the vec_mat data region 172b and a pointer that indicates the last element of the vec_mat data region 172b.

Also, the vec_mat management region 173 stores a matrix flag and a matrix pointer in the direction (negative direction) in which the memory address decreases from the reference position of vec_mat. The matrix flag indicates whether or not the matrix region 174 is used. The matrix flag ON (the value is "1") indicates that the matrix region 174 is used. The matrix flag OFF (the value is "0") indicates that the matrix region 174 is not used. The initial value of the matrix flag is ON ("1"). The matrix pointer indicates the head element of the matrix region 174.

The matrix region 174 is a memory region equivalent to the array_mat region 171 of FIG. 4. The matrix region 174 stores a plurality of data elements in the form of array two-dimensional matrix (fixed-length two-dimensional matrix). Thus, the matrix region 174 has a length corresponding to the number of rows multiplied by the number of columns of the two-dimensional matrix, and densely stores the data elements. While the matrix flag of the vec_mat management region 173 is ON, the matrix pointer of the vec_mat management region 173 and the matrix region 174 are used. During this, the vec_mat data region 172b, the vec_x1 management region 172c, the vec_x2 management region 172d, and the vec_x3 management region 172e are allocated and not used. The initial values of the two-dimensional matrix are written into the matrix region 174. As long as the size is not changed, the data elements of the matrix region 174 are referred and updated.

Thereafter, when a command that changes the size of the two-dimensional matrix (for example, a command that increases the number of columns by inserting an integer at the end of vec_x1) is reached, the matrix flag of the vec_mat management region 173 is rewritten to OFF before the command is executed. Also, the vec_x1 data region 172f, the vec_x2 data region 172g, and the vec_x3 data region 172h are allocated in the memory. Then, the data elements are copied to the vec_x1 data region 172f, the vec_x2 data region 172g, and the vec_x3 data region 172h from the matrix region 174, and the matrix region 174 is deleted from the memory.

After the matrix flag of the vec_mat management region 173 becomes OFF, the vec_mat data region 172b, the vec_x1 management region 172c, the vec_x2 management region 172d, and the vec_x3 management region 172e are used. Also, the vec_x1 data region 172f, the vec_x2 data region 172g, and the vec_x3 data region 172h are used. The data elements of the vec_x1 data region 172f, the vec_x2 data region 172g, and the vec_x3 data region 172h are referred and updated, and the size of the two-dimensional matrix is changed by changing the vec_x1 data region 172f, the vec_x2 data region 172g, and the vec_x3 data region 172h. Thus, the data is not destroyed even if a command that changes the matrix size is executed.

Next, an example of optimization by the compilation apparatus 100 will be described by using a source code. Although a conversion example is described in the form of source code for simplicity of explanation in the following, the compilation apparatus 100 optimizes an intermediate code actually.

FIG. 7 illustrates a first original source code example. A source code 153 is the original code described by a user and illustrates a process procedure before optimization. The source code 153 includes a vector library and refers to the vector library. The source code 153 declares the vector matrices vec_x1, vec_x2, and vec_x3 for storing integers.

Also, the source code 153 declares the vector matrix vec_mat composed of vector matrices for storing integers.

In the source code 153, initial values are stored in vec_x1, vec_x2, and vec_x3 by a for statement. Here, "1" is inserted into vec_x1, and "4" is inserted into vec_x2, and "7" is inserted into vec_x3. Moreover, "2" is inserted into vec_x1, and "5" is inserted into vec_x2, and "8" is inserted into vec_x3. Furthermore, "3" is inserted into vec_x1, and "6" is inserted into vec_x2, and "9" is inserted into vec_x3. Then, vec_x1, vec_x2, and vec_x3 are inserted into vec_mat in this order. Thereby, the vector two-dimensional matrix is initialized.

Thereafter, in the source code 153, matrix operation that uses vec_mat is performed by a for statement. The nine integers stored in vec_mat are referred to by designating a row number i and a column number j. Here, i=0 indicates vec_x1, and i=1 indicates vec_x2, and i=2 indicates vec_x3. Also, j=0 to 2 indicates the element numbers in vec_x1, vec_x2, and vec_x3, respectively. Here, the result obtained by summing the above nine initial values is output as a variable "answer".

FIG. 8 is a diagram for describing a first optimization example in the form of source code. The source code 154 illustrates a process procedure after the aforementioned source code 153 is optimized. The source code 154 declares an array two-dimensional matrix "matrix", in addition to vec_x1, vec_x2, vec_x3, and vec_mat. The number of rows and the number of columns of matrix are decided from the description of the source code 153 by statically analyzing the process for storing the initial values in the vector two-dimensional matrix vec_mat.

In the source code 154, the initial values are not stored in vec_mat, but stored in matrix. At the beginning, vec_mat is not used and thus is needless to store the initial values. When the initial values are stored in matrix, the matrix flag is initialized to ON. Also, when the initial values are stored in matrix, the memory region of vec_mat is allocated. That is, in the source code 154, the declaration of matrix is inserted, and the process for storing the initial values in vec_mat is replaced by the process for storing the initial values in matrix. Also, the process for initializing the matrix flag to ON and the process for allocating the memory region of vec_mat are inserted.

In the source code 154, the matrix operation that uses matrix is inserted in addition to the matrix operation that uses vec_mat. The nine integers stored in matrix are referred to by designating the row number i and the column number j. The matrix operation using matrix outputs the result obtained by summing the nine initial values as the variable "answer", in the same way as the matrix operation that uses vec_mat. Moreover, the source code 154 includes a control structure for selecting the matrix operation using vec_mat or the matrix operation using matrix in accordance with the matrix flag (matrix flag). The matrix operation using matrix is selected when the matrix flag is ON, and the matrix operation using vec_mat is selected when matrix flag is OFF.

FIG. 9 illustrates a second original source code example. The source codes 155 and 156 are original codes described by a user and illustrates a process procedure before optimization. The source code 155 is included in a function that differs from the source code 153 illustrated in FIG. 7, and may be described in the same source file as the source code 153 or in a different source file from the source code 153. The source code 156 is called from the source code 155, and may be described in the same source file as the source code 155 or in a different source file from the source code 155.

The source code 155 includes a vector library and refers to the vector library. The source code 155 uses the vector two-dimensional matrix vec_mat declared by the source code 153. In the source code 155, the number of rows of vec_mat is changed when a certain condition is satisfied. A function resize( ), which is a library function defined in a vector library, is used to change the number of rows. On the other hand, when another branch condition is satisfied, a function call_resize( ) defined by the user is called. In this case, vec_mat is passed as an argument.

The source code 156 includes the vector library and refers to the vector library. The source code 156 includes the function call_resize( ) defined by the user. In the source code 156, vec_mat is acquired as the argument by performing pass-by-reference when call_resize( ) is called. The number of rows of vec_mat is changed in call_resize( ). The function resize( ), which is a library function defined by the vector library, is used to change the number of rows.

In this case, in the source code 155, it is possible that resize( ) is called to change the number of rows of vec_mat. However, resize( ) is not called as long as a certain condition is not satisfied, and thus a time point to call resize( ) is not identified statically. Moreover, in the source code 155, it is possible that call_resize( ) is called to change the number of rows of vec_mat. However, call_resize( ) is not called as long as a certain condition is not satisfied, and a time point to call call_resize( ) is not identified statically.

FIG. 10 is a diagram for describing a second optimization example in the form of source code. The source code 157 illustrates a process procedure after the aforementioned source code 155 is optimized. In the source code 157, a process for rewriting the matrix flag into OFF is inserted immediately before resize( ) is called. Also, a process for copying the integers from matrix to vec_mat is inserted immediately before resize( ) is called. Because both of matrix and vec_mat are handled as a matrix of three rows by three columns, the integer of i-th row and j-th column of matrix is copied to i-th row and j-th column of vec_mat.

In the source code 157, a process for rewriting the matrix flag into OFF is inserted immediately before call_resize( ) is called. Also, a process for copying the integers from matrix to vec_mat is inserted immediately before call_resize( ) is called. Note that a control structure may be inserted in the source code 157 in such a manner that the process for setting the matrix flag to OFF and the process for copying from matrix to vec_mat are executed only when the matrix flag is ON.

Figure 11:
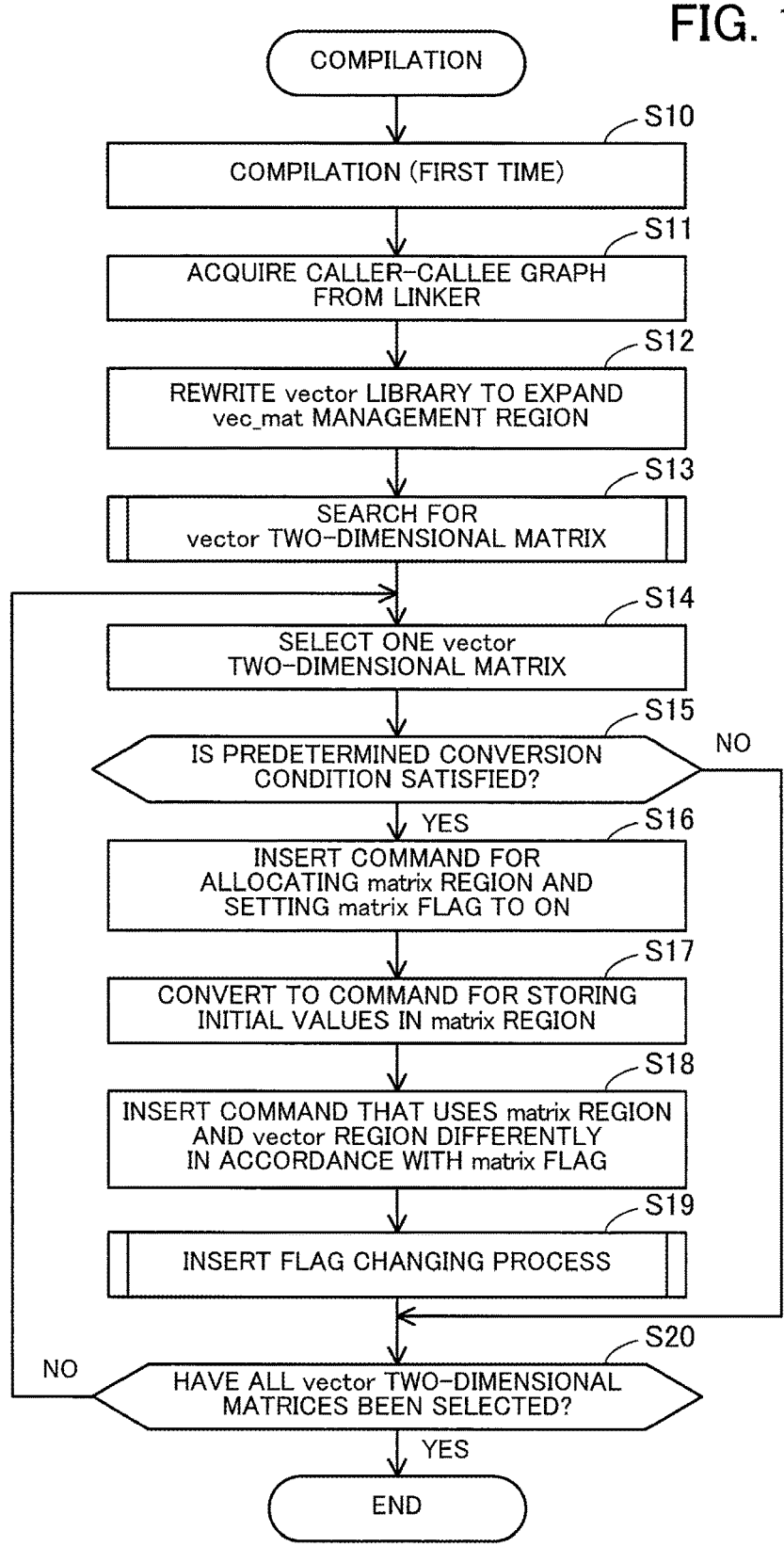
FIG. 11 is a flowchart illustrating a procedure example of compilation.

Next, a compilation procedure of the compilation apparatus 100 will be described. FIG. 11 is a flowchart illustrating a procedure example of compilation.

(S10) The compiler 130 reads out a source code from the source file 121, and performs first compilation of the source code, and writes the generated object code into the object file 122. In the first compilation, the compiler 130 is needless to perform optimization by converting a variable-length two-dimensional matrix to a fixed-length two-dimensional matrix.

(S11) The compiler 130 acquires a caller-callee graph indicating a caller-callee relationship between a plurality of compilation units (for example, a plurality of functions) from the linker 140. The linker 140 generates the caller-callee graph by linking a plurality of compilation units.

The compiler 130 reads out the source code again from the source file 121, and performs second compilation of the source code, and writes the generated object code into the object file 122. In the second compilation, the compiler 130 performs optimization by converting a variable-length two-dimensional matrix to a fixed-length two-dimensional matrix with reference to the caller-callee graph. In the following, the optimization that converts the variable-length two-dimensional matrix to the fixed-length two-dimensional matrix will be described.

(S12) The optimization unit 135 rewrites the vector library to expand the vec_mat management region 173. That is, the optimization unit 135 rewrites the vector library in such a manner that a matrix flag and a matrix pointer are stored at a position in the negative direction of the vec_mat management region 173. Also, the optimization unit 135 rewrites the vector library to access the matrix region 174 from the matrix pointer of the vec_mat management region 173.

(S13) The optimization unit 135 searches for a vector two-dimensional matrix from among the intermediate codes stored in the intermediate code memory unit 134. The detail of the search of the two-dimensional matrix will be described later.

(S14) The optimization unit 135 selects a vector two-dimensional matrix from among the vector two-dimensional matrices that are found in step S13.

(S15) The optimization unit 135 determines whether the vector two-dimensional matrix selected in step S14 satisfies a predetermined conversion condition. If the vector two-dimensional matrix satisfies the predetermined conversion condition, the vector two-dimensional matrix is permitted to be converted to an array two-dimensional matrix. The predetermined conversion condition is to satisfy all of (1) to (5) below, for example.

(1) A vector two-dimensional matrix and a plurality of vector matrices that compose the vector two-dimensional matrix are all declared in the same function. (2) The lengths (the numbers of columns) of the vector matrices are the same and are calculated statically from a source code. (3) The length (the number of rows) of the vector two-dimensional matrix is calculated statically from the source code. (4) In the process for storing initial values in each vector matrix, only the library functions that maintain the continuity of the memory region are used, and the functions that do not necessarily maintain the continuity of the memory region are not used. For example, the former functions are push_back( ) and pop_back( ), and the latter functions are insert( ). (5) The functions that change the matrix size, such as resize( ), are not used in a function in which a vector two-dimensional matrix is declared. Note that the source code 153 of FIG. 7 satisfies the above conversion condition.

The process proceeds to step S16 if the above predetermined conversion condition is satisfied, and the process proceeds to step S20 if the predetermined conversion condition is not satisfied.

(S16) The optimization unit 135 inserts a command for allocating the matrix region 174 in the memory and a command for setting the matrix flag to ON, at a position at which the vector two-dimensional matrix is declared. In this case, the address of the head element of the matrix region 174 is stored as the matrix pointer in the vec_mat management region 173. Note that one matrix flag and one matrix pointer are prepared for one vector two-dimensional matrix declared in the source code. When a plurality of functions shares one vector two-dimensional matrix, the same matrix flag and the same matrix pointer are referred to.

(S17) The optimization unit 135 converts a command for storing initial values in the vector two-dimensional matrix to a command for storing the initial values in the matrix region 174.

(S18) The optimization unit 135 detects a command of matrix operation that uses the vector two-dimensional matrix without changing its size after the initial values are stored in the vector two-dimensional matrix. The optimization unit 135 inserts a command of matrix operation that uses the matrix region 174 instead of the vector two-dimensional matrix, at the position of the detected matrix operation. Also, the optimization unit 135 confirms the matrix flag of the vec_mat management region 173 and inserts a command to selectively execute the above two types of matrix operation in accordance with the matrix flag. For example, the optimization unit 135 inserts a branch command that uses the matrix region 174 when the matrix flag is ON and uses the vector two-dimensional matrix when the matrix flag is OFF.

(S19) The optimization unit 135 detects a command that changes the size of the vector two-dimensional matrix, and inserts a command of a flag changing process immediately before. The detail of the insertion of the flag changing process will be described later.

(S20) The optimization unit 135 determines whether all vector two-dimensional matrices have been selected in step S14. The process ends if all vector two-dimensional matrices have been selected, and the process proceeds to step S14 if there is a vector two-dimensional matrix that has not been selected yet.

Figure 12:
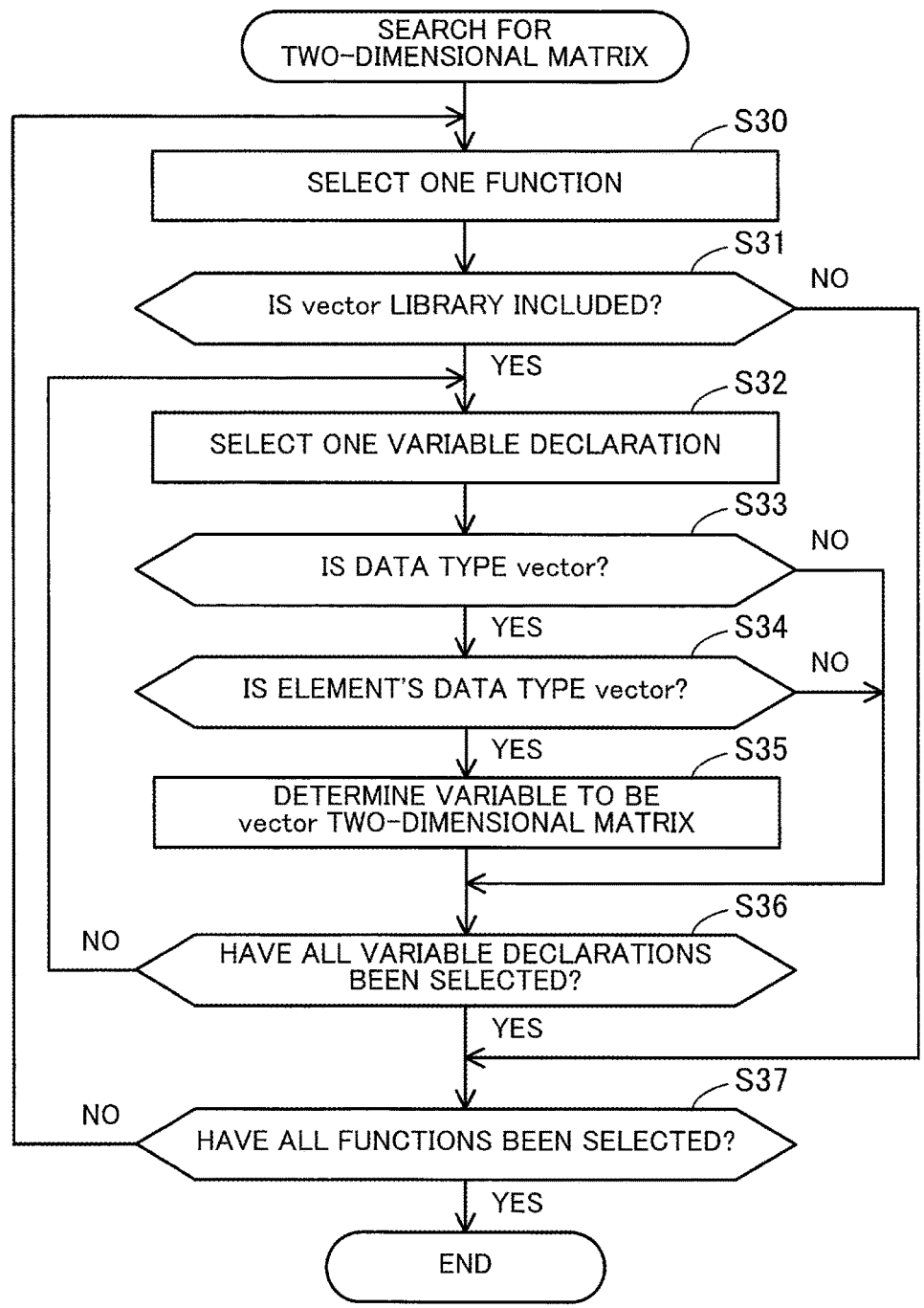
FIG. 12 is a flowchart illustrating a procedure example of search for a two-dimensional matrix.

FIG. 12 is a flowchart illustrating a procedure example of search of a two-dimensional matrix. This two-dimensional matrix search is executed in aforementioned step S13.

(S30) The optimization unit 135 selects one of compilation target functions.

(S31) The optimization unit 135 determines whether the function selected in step S30 includes (refers to) a vector library. The process proceeds to step S32 if the function includes the vector library, and the process proceeds to step S37 if the function does not include the vector library.

(S32) The optimization unit 135 selects one variable declaration from among the variable declarations included in the function selected in step S30.

(S33) The optimization unit 135 determines whether the data type of the variable declaration selected in step S32 is vector. If the data type is vector, the process proceeds to step S34. If the data type is not vector, the optimization unit 135 determines that the variable defined by the variable declaration selected in step S32 is not a vector two-dimensional matrix, and proceeds to step S36.

(S34) The optimization unit 135 determines whether the data type of the elements stored in the vector of step S33 is vector. If the data type of the elements is vector, the process proceeds to step S35. If the data type of the elements is not vector, the optimization unit 135 determines that the variable defined by the variable declaration selected in step S32 is not a vector two-dimensional matrix, and proceeds to step S36.

(S35) The optimization unit 135 determines that the variable defined by the variable declaration selected in step S32 is a vector two-dimensional matrix.

(S36) The optimization unit 135 determines whether all variable declarations in the function have been selected in step S32. The process proceeds to step S37 if all variable declarations have been selected, and the process proceeds to step S32 if there is a variable declaration that has not been selected yet.

(S37) The optimization unit 135 determines whether all functions have been selected in step S30. The optimization unit 135 finishes searching a two-dimensional matrix if all functions have been selected, and the process proceeds to step S30 if there is a function that has not been selected yet.

Figure 13:
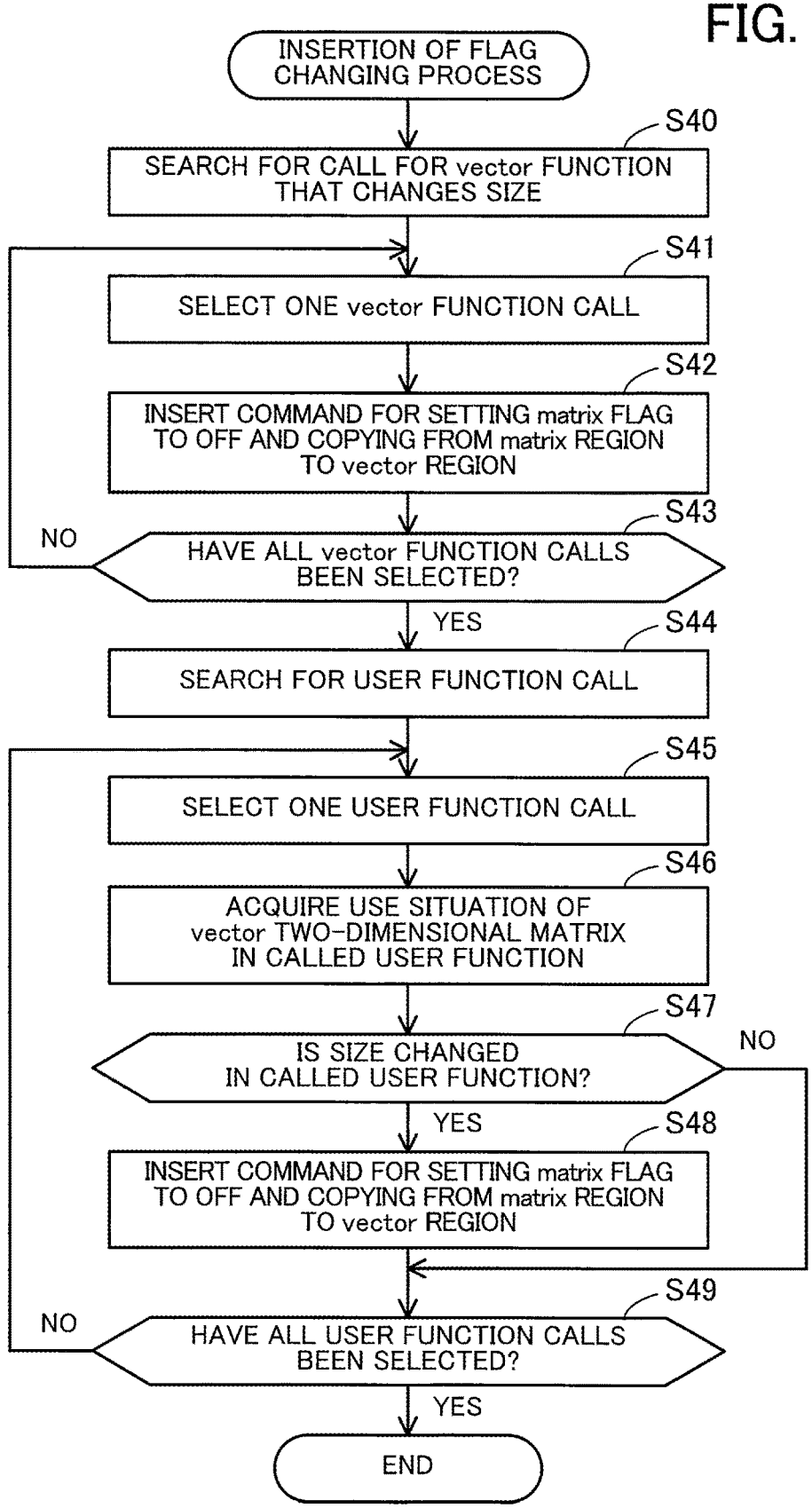
FIG. 13 is a flowchart illustrating a procedure example of insertion of a flag changing process.

FIG. 13 is a flowchart illustrating a procedure example of insertion of a flag changing process. This insertion of a flag changing process is executed in aforementioned step S19.

(S40) The optimization unit 135 searches for a call for a vector library function that changes the size of a vector two-dimensional matrix, from among compilation units (for example, a function of interest). As the size of a vector two-dimensional matrix changes, at least one of the number of rows and the number of columns changes, and the number of rows or the number of columns increases in some cases, and the number of rows or the number of columns decreases in other cases. The vector library function that changes the matrix size includes resize( ) that designates a size explicitly, push_back( ) that adds an element at the end, clear( ) that deletes an element, insert( ) that adds an element in the middle, etc.

(S41) The optimization unit 135 selects one vector library function call from among the vector library function calls that are found in step S40.

(S42) The optimization unit 135 inserts a command for setting the matrix flag to OFF, immediately before the vector library function call selected in step S41. Also, the optimization unit 135 copies the elements from the matrix region 174 to the region of the vector two-dimensional matrix, and inserts a command for deleting the matrix region 174, immediately before the vector library function call. Either one of a command for rewriting the matrix flag and a command for copying the elements may be executed first. The command for rewriting the matrix flag and the command for copying the elements are executed once while the matrix flag is ON. Hence, the optimization unit 135 may insert a control structure that confirms the current matrix flag and branches in accordance with the matrix flag.

(S43) The optimization unit 135 determines whether all vector library function calls have been selected in step S41. The process proceeds to step S44 if all vector library function calls have been selected, and the process proceeds to step S41 if not.

(S44) The optimization unit 135 searches for a call for a user function other than standard library functions, from among the compilation units. The user function includes a function created by the same user of the calling function, as well as a library function (excluding the standard library functions) created by a different user from the user of the calling function. A user function call is searched for with reference to the caller-callee graph acquired in step S11, for example.

(S45) The optimization unit 135 selects one user function call from among the user function calls found in step S44.

(S46) The optimization unit 135 identifies the called user function of the user function call selected in step S45, with reference to the caller-callee graph acquired in step S11. The optimization unit 135 acquires information indicating a use situation of the vector two-dimensional matrix in the called user function. Note that, when the called user function calls another user function, the optimization unit 135 analyzes the called user function recursively.

(S47) The optimization unit 135 determines whether there is a possibility that the size of the vector two-dimensional matrix is changed in the called user function. Specifically, the optimization unit 135 searches for the vector library function call from among the called user functions in the same way as step S40. When the called user function includes a library function call, such as resize( ), push_back( ), clear( ), insert( ), or the like, the optimization unit 135 determines that there is a possibility that the size of the vector two-dimensional matrix is changed. The process proceeds to step S48 if there is a possibility that the size of the vector two-dimensional matrix is changed, and the process proceeds to step S49 if there is no possibility that the size of the vector two-dimensional matrix is changed.

(S48) The optimization unit 135 inserts a command for setting the matrix flag to OFF, immediately before the user function call selected in step S45. Also, the optimization unit 135 copies the elements from the matrix region 174 to the region of the vector two-dimensional matrix, and inserts a command for deleting the matrix region 174, immediately before the user function call. Either one of the command for rewriting the matrix flag and the command for copying the elements may be executed first. The command for rewriting the matrix flag and the command for copying the elements are executed once while the matrix flag is ON. Hence, the optimization unit 135 may insert a control structure that confirms the current matrix flag and branches in accordance with the matrix flag.

(S49) The optimization unit 135 determines whether all user function calls have been selected in step S45. The optimization unit 135 finishes inserting the flag changing process if all user function calls have been selected, and the process proceeds to step S45 if not.

Note that the variable-length two-dimensional matrix optimized in the second embodiment is limited to the vector two-dimensional matrix in which the number of rows and the number of columns are both variable. However, if the number of rows is fixed and the number of columns is variable, it is possible that a memory region that stores the elements of a certain row and a memory region that stores the elements of the next row are discontiguous. Thus, the compilation apparatus 100 may set the variable-length two-dimensional matrix in which the number of rows is fixed and the number of columns is variable, as a target of optimization. That is, it is conceived that the variable-length two-dimensional matrix in which at least the number of columns is variable is converted to the fixed-length two-dimensional matrix.

According to the compilation apparatus 100 of the second embodiment, a command that uses the variable-length two-dimensional matrix at the time of compilation is automatically converted to a command that uses a fixed-length two-dimensional matrix. Thus, the number of times of tracing pointers when accessing an element of the two-dimensional matrix decreases, and the memory access efficiency improves. Also, all elements of the two-dimensional matrix are stored densely in the contiguous memory regions, and the use efficiency of the cache memory improves. Also, the fixed-length two-dimensional matrix is set back to the variable-length two-dimensional matrix, immediately before the command for changing the size of the two-dimensional matrix. Thus, destruction of the data of the two-dimensional matrix is prevented, and the process intended by the source code is achieved.

Also, the user is needless to use the fixed-length two-dimensional matrix to improve the execution efficiency of the object code, and instead uses the variable-length two-dimensional matrix that is needless to designate the size at the time of variable declaration, and thereby easily creates a source code. Also, the matrix flag and the matrix pointer are stored in the negative direction of the management region, adjacent to the management information of the variable-length two-dimensional matrix. Thereby, the matrix flag and the matrix pointer are maintained safely in the memory and are prevented from being lost. For example, when the management information of the variable-length two-dimensional matrix is moved, the matrix flag and the matrix pointer are easily moved together, and thus the matrix flag and the matrix pointer are kept linked to the variable-length two-dimensional matrix.

In one aspect, the execution efficiency of an execution program that uses a matrix improves.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure comprising:
   acquiring a source code that describes a first matrix process that uses a variable-length matrix and a size change process that changes a size of the variable-length matrix after a start of the first matrix process;
   generating a first code for selectively executing the first matrix process and a second matrix process that uses a fixed-length matrix corresponding to the variable-length matrix, and generating a second code for selecting the second matrix process from among the first and second matrix processes, as an initial state of the first code, based on description of the first matrix process;
   generating a third code for moving data stored in the fixed-length matrix to the variable-length matrix and for switching the second matrix process to the first matrix process in the first code, at a position corresponding to the size change process; and
   generating an execution program including the first, second, and third codes.

2. The non-transitory computer-readable storage medium according to claim 1, wherein
   the first code executes the first matrix process when a flag stored in a predetermined memory region is a first value, and executes the second matrix process when the flag is a second value,
   the second code sets the flag to the second value, and
   the third code changes the flag to the first value.

3. The non-transitory computer-readable storage medium according to claim 2, wherein
   the predetermined memory region is at a predetermined relative position in relation to another memory region allocated for the variable-length matrix.

4. The non-transitory computer-readable storage medium according to claim 1, wherein
   the variable-length matrix is a variable-length multidimensional matrix in which a number of elements of at least one dimension is variable, and the fixed-length matrix is a fixed-length multidimensional matrix in which a number of elements in each dimension is invariable.

5. A compilation method comprising:
   acquiring, by a processor, a source code that describes a first matrix process that uses a variable-length matrix and a size change process that changes a size of the variable-length matrix after a start of the first matrix process;
   generating, by the processor, a first code for selectively executing the first matrix process and a second matrix process that uses a fixed-length matrix corresponding to the variable-length matrix, and generating a second code for selecting the second matrix process from among the first and second matrix processes, as an initial state of the first code, based on description of the first matrix process;
   generating, by the processor, a third code for moving data stored in the fixed-length matrix to the variable-length matrix and for switching the second matrix process to the first matrix process in the first code, at a position corresponding to the size change process; and
   generating, by the processor, an execution program including the first, second, and third codes.

6. An information processing apparatus comprising:
   a memory configured to store a source code that describes a first matrix process that uses a variable-length matrix and a size change process that changes a size of the variable-length matrix after a start of the first matrix process; and
   a processor configured to:
   generate a first code for selectively executing the first matrix process and a second matrix process that uses a fixed-length matrix corresponding to the variable-length matrix, and generating a second code for selecting the second matrix process from among the first and second matrix processes, as an initial state of the first code, based on description of the first matrix process,
   generate a third code for moving data stored in the fixed-length matrix to the variable-length matrix and for switching the second matrix process to the first matrix process in the first code, at a position corresponding to the size change process, and
   generate an execution program including the first, second, and third codes.

* * * * *